(No Model.)

F. A. ROBERTS.
ADJUSTABLE SUPPORT.

No. 573,923. Patented Dec. 29, 1896.

Witnesses.
Chas. F. Stanetz
E. M. Healy.

Inventor.
F. A. Roberts,
By
Southgate & Southgate
Attorneys.

UNITED STATES PATENT OFFICE.

FREDERICK A. ROBERTS, OF GARDNER, MASSACHUSETTS.

ADJUSTABLE SUPPORT.

SPECIFICATION forming part of Letters Patent No. 573,923, dated December 29, 1896.

Application filed April 29, 1896. Serial No. 589,561. (No model.)

*To all whom it may concern:*

Be it known that I, FREDERICK A. ROBERTS, a citizen of the United States, residing at Gardner, in the county of Worcester and State of Massachusetts, have invented a new and useful Improvement in Adjustable Supports, of which the following is a specification.

The object of my invention is to provide a strong, simple, and efficient adjustable supporting device in which the parts are secured together so that they cannot be displaced or lost; and the especial object of my invention is to provide an adjustable support for the shade-rod of baby-carriages.

To these ends my invention consists of the parts and combinations of parts, as hereinafter described, and more particularly pointed out in the claims at the end of this specification.

Figure 1:
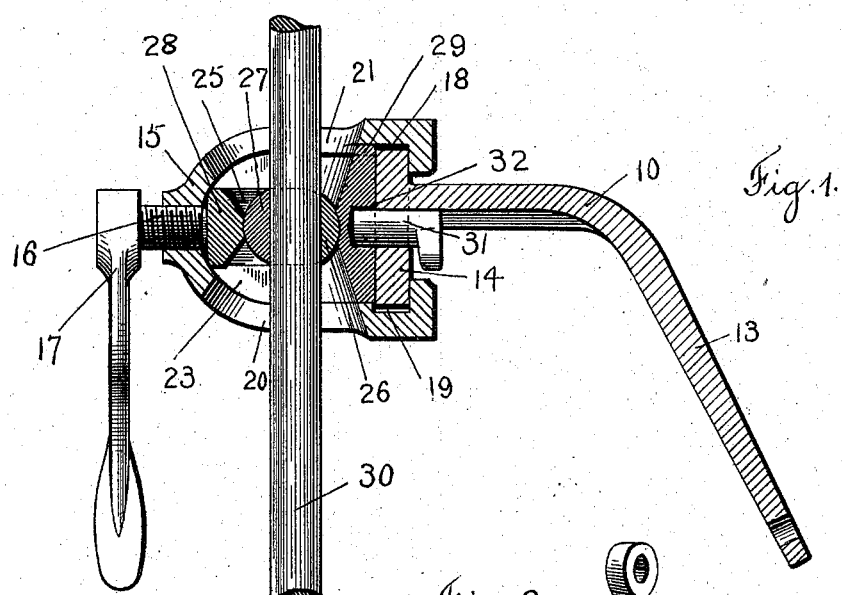
Figure 2:
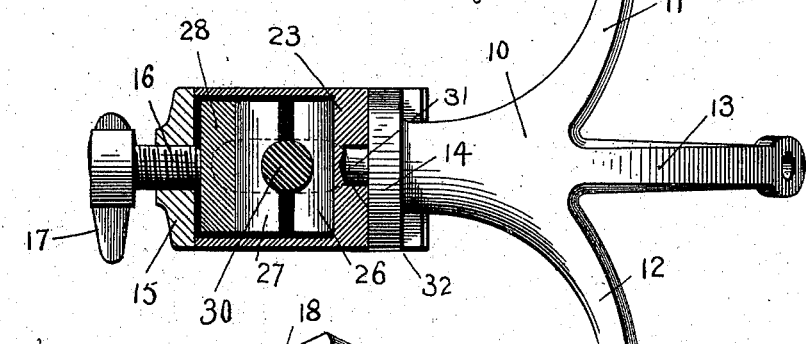
Figure 3:
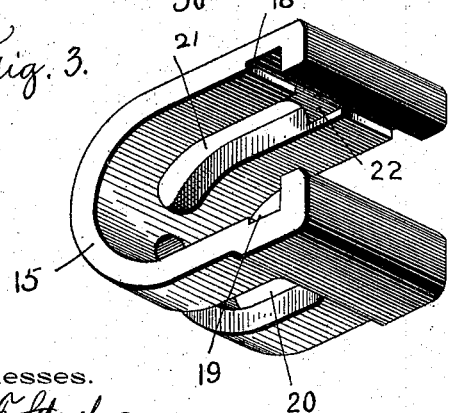
Figure 4:
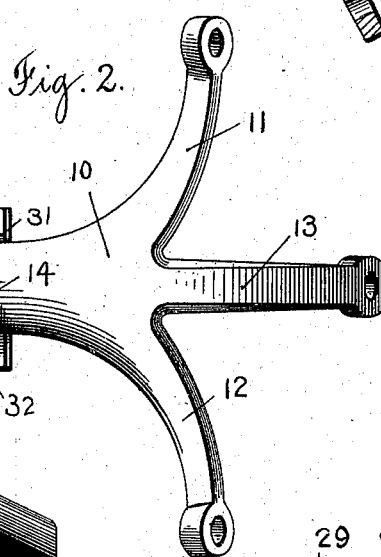

In the accompanying drawings, Figure 1 is a vertical sectional view of an adjustable support constructed according to my invention. Fig. 2 is a transverse sectional view of the same; and Figs. 3 and 4 are perspective views of the yoke and socket-piece, respectively.

An adjustable support constructed according to my invention comprises a base or bracket, a yoke rotatably mounted on the base or bracket, a socket-piece fitting into said yoke, and a single clamping device for adjustably securing a rod or pipe section in the socket-piece and simultaneously clamping the yoke and socket-piece into engagement with the base or bracket.

Referring to the drawings and in detail, 10 designates the base or bracket. The bracket 10, as illustrated, is provided with three supporting-arms 11, 12, and 13 and with a projecting circular head 14. A piece or yoke 15 is rotatably mounted upon the head 14 of the bracket. As illustrated, the yoke 15 is provided with transverse ways or grooves 18 and 19 for engaging the head 14, and with a longitudinal groove or way 22 for receiving a lug or projection of the socket-piece. Upon its opposite sides the yoke 15 is slotted, as at 20 and 21, to allow for the introduction of the rod or pipe section 30. A clamping bolt or screw 16 is threaded into the outer end of the yoke 15 and is provided with a clamping-handle 17. The socket-piece 23 is slotted to receive the rod or pipe section and is provided with a lug or projection 29 for engaging the groove 22 in the yoke 15. The socket-piece 23 is also provided with longitudinal grooves 24 and 25 for receiving the clamping-pieces 26 and 27 and a follower 28.

Fastened or driven into the head 14 of the base or bracket 10 is a dowel or fastening pin 31, which fits into a recess 32 in the socket-piece 23.

In assembling an adjustable support constructed according to my invention the clamping-sections 26 and 27 and the follower 28 are first placed in the grooves 24 and 25 of the socket-piece 23. The socket-piece 23 is then fitted into the yoke 15, so that its lug or projection 29 will engage with the groove 22 in the yoke. The yoke 15 is then fitted onto the base or bracket 10, so that its grooves 18 and 19 will engage the projecting circular head 14. To retain the parts in this adjusted position, the dowel or pin 31 is then driven into the circular head 14, so as to engage the recess 32 in the socket-piece. By means of this construction it will be seen that the dowel or pin 31 will be so located that it will preserve the connection between the different parts of the adjustable supporting device and that said parts cannot become detached or lost as long as the pin 31 remains in place.

If desired, in order to prevent the removal or loss of the clamping-screw 16 the inner end of the same may be slightly headed, so that it cannot be withdrawn or unscrewed.

When an adjustable supporting device as thus constructed is used as a support for the shade-rod of a baby-carriage, it will be seen that the rod 30 can be turned and moved to the desired position in the socket-piece and that the yoke and socket-piece can be rotated to the desired position upon the head 14 of the bracket.

By tightening the clamping-screw 16 the shade-rod will be secured in position in the socket-piece, and at the same time the yoke and socket-piece will be firmly clamped into engagement with the bracket, thus supporting the rod at any desired inclination or height.

I am aware that adjustable supports constructed according to my invention may be used for different purposes and in different locations, and that changes may be made in the construction by those who are skilled in the art without departing from the scope of my invention as expressed in the claims. I do not wish, therefore, to be limited to the form which I have shown and described; but What I do claim, and desire to secure by Letters Patent of the United States, is—

1. In an adjustable support, the combination of a base or bracket having a circular or disk-shaped head, a yoke, a socket-piece mounted in said yoke, and means for clamping said yoke and socket-piece into engagement with the opposite sides of said head, substantially as described.

2. In an adjustable support, the combination of a base or bracket having a circular or disk-shaped head, a yoke engaging the rear face of said head, a socket-piece engaging the front face of said head, a pin concentric with the head, and arranged to fit into a recess in the socket-piece, and a clamping device for securing a rod or pipe section in the socket-piece, and clamping the yoke and socket-piece into engagement with said head, substantially as described.

3. In an adjustable support, the combination of a base or bracket having an extending head, a piece or yoke engaging said head, a socket-piece having a lug or projection engaging a groove in the yoke, clamping-sections and a follower mounted in said socket-piece, a clamping-screw for securing a rod or pipe section in the socket-piece, and simultaneously clamping the yoke or socket-piece into engagement with the head extending from the bracket, and a dowel-pin extending from the base or bracket into a recess in the socket-piece for preventing the parts from separating, substantially as described.

In testimony whereof I have hereunto set my hand in the presence of two subscribing witnesses.

FREDERICK A. ROBERTS.

Witnesses:
LOUIS W. SOUTHGATE,
PHILIP W. SOUTHGATE.